Aug. 20, 1935.  J. R. OISHEI  2,012,254
WINDSHIELD CLEANER
Filed Feb. 11, 1932  2 Sheets-Sheet 1
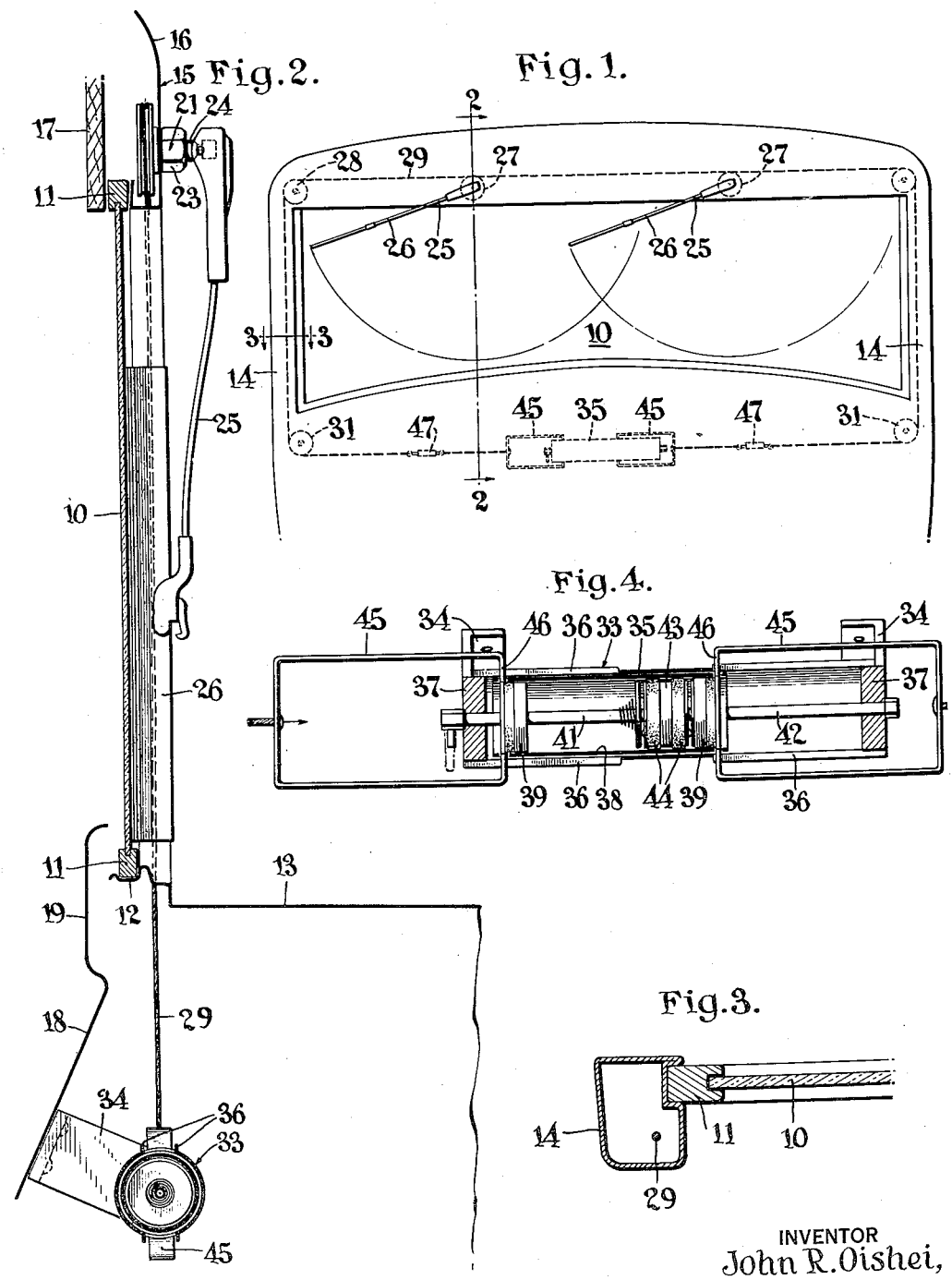
INVENTOR
John R. Oishei,
BY
Bean & Brooks, ATTORNEYS

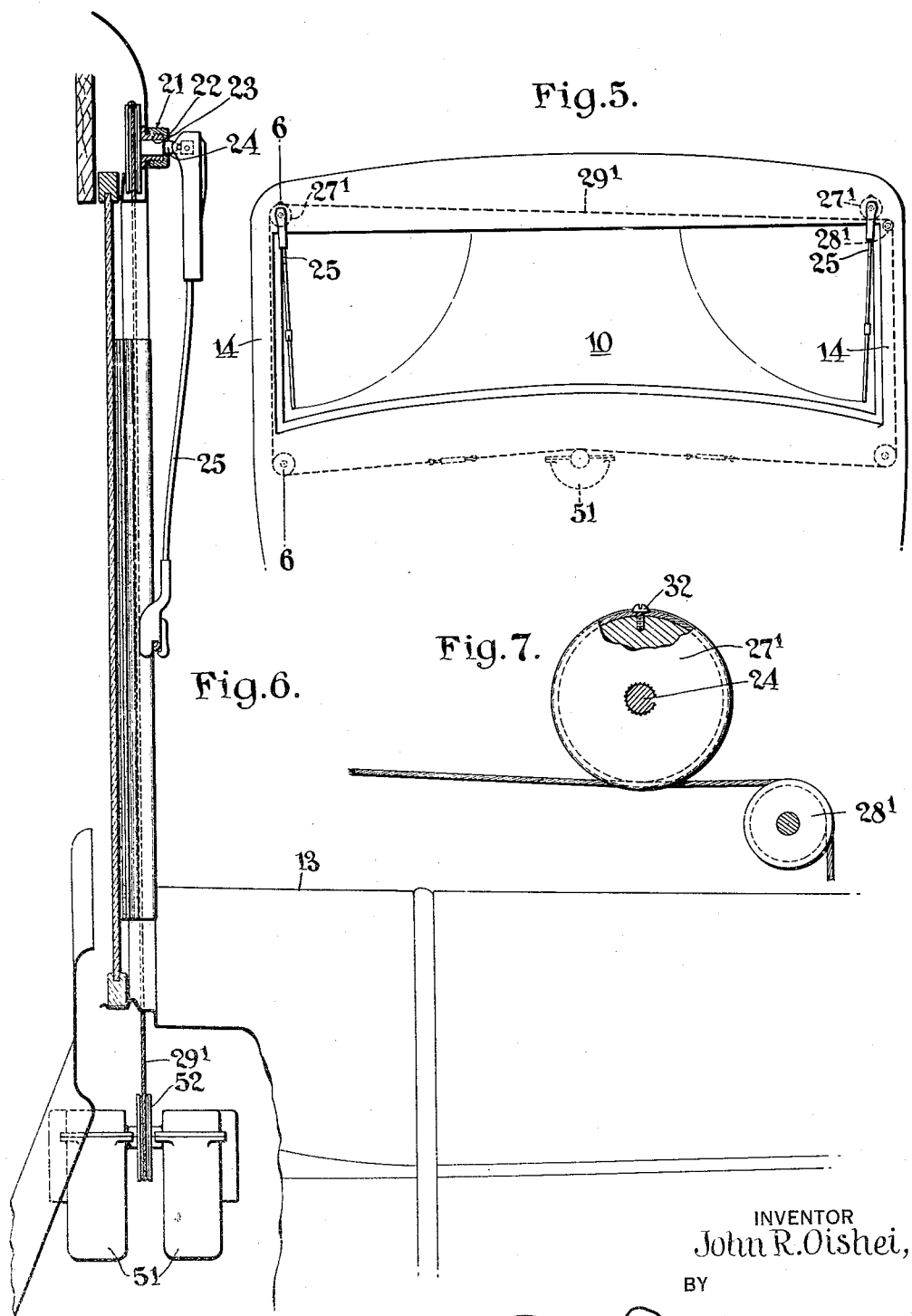

Patented Aug. 20, 1935

2,012,254

UNITED STATES PATENT OFFICE 2,012,254

WINDSHIELD CLEANER

John R. Oishei, Buffalo, N. Y., assignor to Trico Products Corporation, Buffalo, N. Y.

Application February 11, 1932, Serial No. 592,426

2 Claims. (Cl. 15—255)

This invention relates to a vehicle windshield cleaner and vehicle body structure for accommodating such cleaner.

Heretofore, unitary devices for cleaning windshields have been provided on vehicles and have comprised small motors, operable by suction created by the vehicle engine or by electricity, and wiper blades depending from these motors and operable thereby across the face of the windshields. In some instances the motor has been mounted upon the outside of a header bar extending across the upper surface of the windshield and has been protected from undue exposure by a visor which extends forwardly from the header bar.

For improving the appearance and increasing the efficiency of vehicles, by lessening air resistance, it has become desirable to eliminate the visor, and in order to further improve the appearance and reduce the air resistance of the vehicle and to provide for housing the windshield cleaner motor without encumbering the driver's compartment of the vehicle, the present invention contemplates a novel association of the windshield cleaner parts with the vehicle body. The invention further contemplates the provision of mechanism entirely concealed within the vehicle body structure for actuating a plurality of wipers, thereby obviating the necessity of external linkage between plural wipers such as is now conventionally used.

These and other objects and advantages will become apparent from the following description of typical embodiments of the invention, reference being made to the accompanying drawings, wherein:—

Fig. 1 is a front elevation of the portion of a vehicle body adjacent to and including the windshield, with windshield wipers and operating mechanism therefor provided in accordance with the teachings of the instant invention.

Fig. 2 is a vertical cross-section taken on line 2—2 of Fig. 1.

Fig. 3 is a horizontal section taken along the line 3—3 of Fig. 1.

Fig. 4 is a longitudinal vertical section through the windshield cleaner motor depicted in Figs. 1 and 2.

Figs. 5 and 6, similar to Figs. 1 and 2, respectively, are views depicting another embodiment of the invention.

Fig. 7 is a detail elevation of portions of the wiper actuating mechanism of Figs. 5 and 6.

As shown in the drawings, the vehicle body has a windshield 10, with a bordering frame 11, supported on a member 12 extending rearwardly from the cowl 13. At the ends of the windshield are hollow upright frame members 14 supporting a hollow header 15 which extends across the top of the windshield. The header may have an outer metallic wall 16 merging with the top of the vehicle body and an inner wall 17. Sufficient space may be provided between the header walls to allow the windshield to be raised thereinto. An instrument panel 18, or equivalent structure, may have a molding 19 adjacent the lower portion of the windshield.

Adjacent each end of the windshield and extending through the wall 16 of the header are bearing members 21, which, as shown in Fig. 6, may each comprise a sleeve 22 having a flange abutting the inner surface of the wall and a retaining cap 23 threaded to the outwardly extending portion of the sleeve. A wiper rock shaft 24 is journalled in each bearing and carries at its outer end a wiper arm 25 for supporting a wiper blade 26 in contact with the windshield glass 10. Pulley wheels 27, or equivalent radial extensions are affixed to the inner ends of the rock shafts, being disposed forwardly of the space between the header parts 16 and 17 in order to not interfere with raising of the windshield.

Guide means, preferably in the form of pulleys 28, are mounted, in alignment with the hollows of the frame members 14 and of the headers, adjacent the upper corners of the windshield for guiding a flexible member 29, which is engaged with pulley wheels 27 and extends through the header and side frame members 14. Similar guide means 31 are mounted adjacent the lower corners of the windshield. As indicated in Fig. 7, the flexible member may pass completely about the pulleys on the rock shafts and may be secured thereto by means such as the screw 32, in order to preclude slippage.

A motor 33, housed beneath the cowl 13, may be secured to the panel 18 of the vehicle by a bracket means 34. The motor shown is of the fluid pressure type and comprises a tubular casing 35 having flanged guide slots 36 and head members 37 at the ends thereof. A tubular piston 38 has closed ends 39 adjacent the ends thereof which are slidable on tubular rod portions 41 and 42 fixed to the head members 37 and which are connectible to atmospheres of different pressures. A central body 43 provided with packing 44 is secured centrally of the rods 41 and 42 and carries suitable valve mechanism operable by abutment of the closure members 39 of the piston to alternately apply greater fluid pressure to one end of the piston than to the other. The piston 38, thus reciprocated, carries with it bails 45 which have end portions 46 engaged with the piston and guided in the flanged slots 36.

The bails are connected to the flexible member 29 which will accordingly be reciprocated and will effect oscillation of the wiper blades 26 across the outer face of the windshield to remove moisture and dirt therefrom. In order to adjust the length of the flexible members, turnbuckles 47, of any suitable form, are provided. Two turnbuckles, one on each side of the motor, are preferred in order that the normal positions of the wiper arms 25 may be adjusted with respect to the windshield edges without varying the relation of the portions of the flexible member that are engaged with the pulleys 27 with the latter.

In the form of the invention shown in Figs. 5 and 6, the wiper arms 25 are mounted adjacent to the side frame members 14 so that when in the inoperative position shown, substantially the entire windshield will be unobstructed. In order to secure the simultaneous operation of the wipers from inoperative position, their direction of movement is reversed by passing the flexible member 29' in a counter-clockwise direction about one pulley 27' and by passing the flexible member in a clockwise direction about the other pulley 27'. By reason of the disposition of the pulleys 27' close to the frame members 14, one guide member may be eliminated as shown at the upper left of Fig. 5, while a guide member 28' is provided adjacent the other pulley 27' (note Fig. 7).

The drive means shown in Figs. 5 and 6 include a pair of oscillating blade type motors 51, mounted face to face and having their drive shafts coaxial and either connected or integral. A drive pulley 52 is mounted between the motors and engages the flexible member 29' for reciprocating the wipers. In both forms of the invention the motor is directly beneath the instrument panel so that control means for the windshield cleaner may be conveniently arranged on the instrument panel adjacent other vehicle controls.

It will be understood that while the motor shown in Fig. 4 is particularly adapted for operating a cleaner assembly of the type herein described, either of the illustrated motor means or others, may be substituted in either of the arrangements shown in Figs. 1 and 5, and it will be further understood that other changes in arrangement and formation of parts may be made all within the purview of the invention, the foregoing description and illustration being merely illustrative of the principles involved.

What is claimed is:

1. In a vehicle body and windshield cleaner therefor, a windshield, hollow upright frame members at the sides of the windshield, a header having an inner wall and an outer wall spaced therefrom, said outer wall being substantially coplanar with the plane of the fronts of said frame members, said windshield being guided by said frame members for vertical movement into the space between said walls, said outer wall having a bearing therein, a wiper shaft extending through said bearing, a windshield wiper on the outer end of the shaft, means on the inner end of the shaft and disposed forwardly of the plane of the windshield for driving engagement with a flexible drive member, a flexible drive member extending through said hollow frame members and header and engaging said means on the inner end of the shaft, and means below the windshield for reciprocating the flexible member to thereby effect oscillation of the shaft and wiper.

2. In a vehicle body and windshield cleaner therefor, a windshield, hollow upright frame members at the sides of the windshield, a hollow header structure above the windshield, and a cowl structure beneath the windshield including an instrument panel disposed at the rear of the cowl structure and in a plane rearward of the plane of the front surfaces of the upright frame members, a wiper shaft journalled in and extending through the front wall of the header, said shaft having a radial extension on the inner end thereof in substantially the vertical plane of the hollow of said upright frame members, a motor secured within said cowl structure forwardly of the instrument panel, said motor having a reciprocating part substantially in said vertical plane, and a flexible member connecting said reciprocating part and said radial extension of the shaft, and extending through the hollows of said upright frame members, whereby reciprocation of the said part by the motor will cause reciprocation of the flexible member and angular oscillation of the shaft.

JOHN R. OISHEI.